United States Patent [19]
Conradi et al.

[11] Patent Number: 5,073,261
[45] Date of Patent: Dec. 17, 1991

[54] METHOD AND APPARATUS FOR SEPARATING OIL FROM WATER AND STORING THE OIL

[76] Inventors: Trond Conradi, 108 Little John Rd., Williamsburg, Va. 23185; Hugh Williams, 400 E. Randolph Dr., Apt. #3024, Chicago, Ill. 60601

[21] Appl. No.: 568,993

[22] Filed: Aug. 17, 1990

[51] Int. Cl.$^5$ ............................ C02F 1/40; E02B 15/04
[52] U.S. Cl. ................................. 210/242.1; 210/521; 210/536; 210/538; 210/923
[58] Field of Search .................. 210/242.1, 242.3, 521, 210/533, 536, 538, 923

[56] References Cited

U.S. PATENT DOCUMENTS

| | | | |
|---|---|---|---|
| 1,708,021 | 4/1929 | Lenz | 210/538 |
| 3,463,172 | 8/1969 | Naylor | 210/521 |
| 3,508,652 | 4/1970 | Woolley | 210/923 |
| 3,690,464 | 9/1972 | Heinicke | 210/923 |
| 3,756,294 | 9/1973 | Rainey | 210/923 |
| 3,826,740 | 7/1974 | Jewett | 210/521 |
| 3,875,062 | 4/1975 | Rafael | 210/923 |
| 3,966,614 | 6/1976 | Azers | 210/923 |
| 4,132,652 | 1/1979 | Anderson | 210/536 |
| 4,381,994 | 5/1983 | Azers | 210/923 |

FOREIGN PATENT DOCUMENTS 555806 7/1932 Fed. Rep. of Germany .

Primary Examiner—Stanley S. Silverman
Assistant Examiner—Christopher Upton
Attorney, Agent, or Firm—Malin, Haley, McHale, DiMaggio & Crosby

[57] ABSTRACT

A collapsible container for separating oil and water and containing and transporting the separated oil is provided. The container is manufactured of a water impervious material and has a plurality of chambers, capable of holding oil and water, which are attached to each other serially along a linear axis. Located at opposite ends of the container are an input chamber and an output chamber. Intermediate the input and output chambers is at least one intermediate chamber. Substantially vertically disposed baffles, having an opening at their lower edges, are provided within the container defining the connecting walls between the input chamber and the adjoining intermediate chamber and the connecting walls between adjacent intermediate chambers. A baffle, also substantially vertically disposed, having an opening at its upper edge, is provided within the container defining the connecting wall between the output chamber and the intermediate chamber located farthest from the input chamber. An inlet allowing an oil and water mixture to enter the inlet chamber is provided. In addition, an outlet attached to the outlet chamber is provided to allow material within the outlet chamber to exit the container.

16 Claims, 1 Drawing Sheet

METHOD AND APPARATUS FOR SEPARATING OIL FROM WATER AND STORING THE OIL

BACKGROUND OF THE INVENTION

1. Field of the Invention

This device relates to an invention for separating oil and water and for then storing the separated oil. More particularly, the invention relates to a collapsible container for separating oil from water resulting from oil spills in an open body of water and for storing and transporting the separated oil so the oil can later be removed from the device.

2. Description of the Related Art

Several devices currently exist for separating oil from water Exemplary of these are U.S. Pat. No. 3,508,652 issued to J. E. Woolley on Apr. 26, 1980 and U.S. Pat. No. 3,875,062 issued to J. Rafael on Apr. 1, 1975. The Woolley device shows a single flexible container which floats in the sea and is connected at one end by an inlet pipe to a pump on a pontoon. The pump pumps a mixture of oil and water from an oil slick into the container. At the other end of the container is an outlet connected to an outlet pipe lying on the bottom of the container.

The oil and water mixture is pumped into the container at such a rate that it separates into an upper oil layer and a lower water layer. As the oil and water mixture is pumped into the container through the inlet pipe, due to hydrostatic pressure, the separated water is expelled from the container through the outlet pipe lying on the bottom of the container. The oil floating on the top of the water is retained in a container until the container is nearly full of oil. At this time oil will begin to be forced out of the inlet pipe indicating that the container is full. The outlet and inlet pipes are then closed. The container may then be towed back to shore where it may be emptied.

The Rafael device is a floating body which contains an inlet opening for moving an oil and water mixture into a dome shaped collection chamber by skimming a top layer of oil and water mixture as the device moves through the water. The inlet opening may be adjusted upward or downward in the polluted water so that the height of the water to be skimmed may be adjusted. At the rear end of the collecting chamber are a plurality of ducts which extend across the entire width of the collecting chamber. These ducts end in a constricted outlet opening which slows down the water and oil mixture as it moves through the ducts sufficiently so that oil particles in the water and oil mixture are separated. The separated oil, being lighter than water, rises up to the top of the dome-shaped chamber where it is removed.

Neither the Woolley nor the Rafael device provides means for appreciably reducing agitation within each of the devices in containers or chambers in order to enhance oil and water separation or provide a plurality of chambers for progressively separating oil and water.

SUMMARY OF THE INVENTION

The instant invention provides an improved method and apparatus for separating oil and water collected from an oil spill and for storing the separated oil until it can be removed or processed. The device comprises a collapsible container having a plurality of flexible internal cylindrical chambers aligned in a linear fashion along a common longitudinal axis. In this manner, each interior chamber may at most have two nearest neighbor chambers located on opposite sides of a selected chamber. Clearly, the chambers on both ends of the device will have only one nearest neighbor.

Connecting each chamber within the container to its neighbor chamber is a common baffle. These baffles will have either an opening at the bottom or the top as will be described in more detail hereafter.

A chamber at one end of the device has an inlet through which an oil and water mixture pumped from an oil slick enter the device The inlet is located near the top of the chamber. This chamber is designated the inlet chamber while the chamber at the opposite end of the device contains an outlet near the bottom of the chamber and is designated the outlet chamber. Pumping a mixture of oil and water into the device through the inlet creates pressure within the device which causes fluid to flow through the device.

The oil and water mixture will begin to separate soon after the mixture is admitted into the inlet chamber. This is because oil has a lower specific gravity than water causing it to be buoyant in water and therefore rise above the water. The amount of separation is a function of time and agitation of the water. The more agitated the mixture is, the less separation will take place. Also, the more time the mixture is in a non-agitated state, the more separation will take place. In order to maximize the amount of time that the water and oil mixture has to separate, and to reduce the amount of agitation the oil and water mixture is subjected to, the instant invention was conceived and constructed.

In operation, the oil and water mixture enters the inlet chamber through the inlet under pressure. This process introduces a certain amount of agitation to the oil and water mixture in the inlet chamber. In order to minimize the amount of agitation propagated throughout the device, a baffle is placed between the inlet chamber and the rest of the device. This baffle has an opening placed at the bottom to allow an amount of water and oil mixture to escape the inlet chamber into the adjoining chamber. The amount of water and oil entering the adjoining chamber is approximately equal to the amount of oil and water mixture applied to the inlet chamber. The opening at the bottom of the baffle is of sufficient size to allow the oil and water mixture to flow from the inlet chamber to the adjoining chamber without introducing additional agitation but is not sufficiently large to allow appreciable amount of agitation in the inlet chamber to pass through the adjoining chamber.

The chamber adjoining the inlet chamber is called an intermediate chamber. Upon entry of the oil and water mixture from the inlet chamber into the intermediate chamber through the opening in the baffle, the oil and water mixture will begin to separate with the oil rising to the top of the intermediate chamber. As the water and oil mixture is allowed to spend time in the intermediate chamber, the oil and water separation will become more pronounced, further separating oil and water. The result of this separation process is that oil will begin to collect at the top of the intermediate chamber whereas the water at the lower end will be progressively less contaminated with oil.

Additional intermediate chambers may be placed in series with the intermediate chamber adjoining the inlet chamber. These additional intermediate chambers allow the oil and water separation process to be carried out progressively in the individual intermediate chambers.

The baffles separating individual intermediate chambers will have openings at the bottom exactly like those baffle openings separating the inlet chamber and the first intermediate chamber. Because oil and water separation is taking place in each of the intermediate chambers, the oil and water mixture flowing through the baffle separating each intermediate chamber will become less and less contaminated with oil. However, as the initial intermediate chambers begin to fill with oil, oil will begin to leak through the openings in the baffles into the adjoining chambers. In this way, the oil chambers will become progressively filled with oil from the first intermediate chamber to the subsequent intermediate chambers.

The baffle separating the outlet chamber and the final intermediate chamber is the only baffle having an opening at the too of the baffle. As the intermediate chambers become progressively filled with oil, oil will flow from chamber to chamber through the openings int he bottom of the baffles. When oil begins to spill into the final intermediate chamber, the oil will rise and begin to accumulate at the top of the final intermediate chamber and the top of the outlet chamber. Both chambers will begin to fill with oil so that when they are both full, oil will begin to escape through the outlet. At this time, pumping of the oil and water mixture should cease and both the inlet and outlet closed. The device may then be used to store the oil where it is or may be towed to an area for oil removal or separation.

Plastic ribs are attached to the outside of the device in the preferred embodiment to add rigidity and definition of shape when the device is in both the storage and operational configurations.

Tow lines may be placed at either end of the device so that it may be effectively positioned during both the oil and water separation phase of its operation or to move the device once it is filled with oil.

A flotation chamber may be placed around the device which may be filled with air or similar gas to make the device more buoyant. Use of the flotation chamber may be particularly useful when the device is first deployed and before it has a chance to fill with oil.

It is an object of this invention to provide a dracone container that is collapsible for storage aboard a vessel that can be quickly and efficiently employed to capture oil from an oil spill in the open sea.

It is another object of this invention to provide a flexible container that can collect, store and be used as a towing device in the open sea to retrieve oil from an oil spill.

It is another object of this invention to provide an efficient flexible lightweight container that can efficiently separate oil from sea water in an oil spill environment for collection and transport of the oil to a predetermined location.

Still another object of this invention is to provide an oil retrieving container for use in the open sea which efficiently separates the oil and water through a noncomplex lightweight baffle arrangement within the flexible container.

In accordance with these and other objects which will be apparent hereinafter, the instant invention will now be described with particular reference to the accompanying drawings.

DETAILED DESCRIPTION OF THE INVENTION

Figure 1:
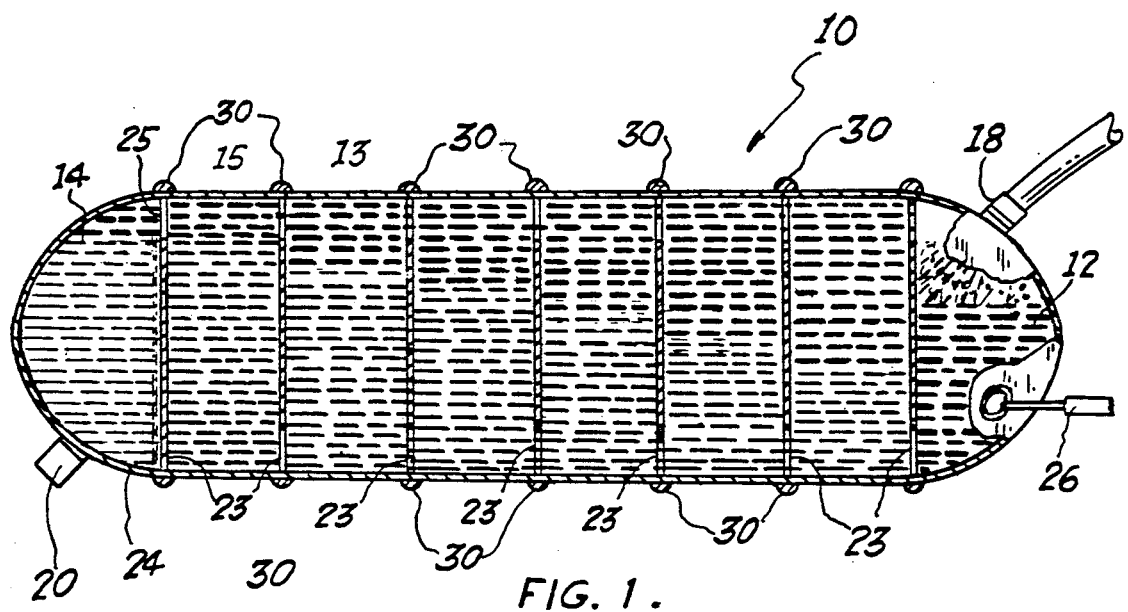
FIG. 1 is a side elevational view of the device in its operational configuration.

FIG. 1 shows the flexible container generally labeled 10. The container 10 includes inlet chamber 12, outlet chamber 14, and a plurality of intermediate chambers 13 in a linear arrangement. The respective container chambers 12, 13, and 14 are separated by baffles 22, 24 as described in more detail hereafter. The container and chambers are made of a flexible, sturdy collapsible material, such as synthetic rubber, that allows them to be compressed on the longitudinal axis of the container to the storage position shown in FIG. 2. The baffles are also made of a flexible sturdy material such as synthetic rubber which provides an effective partial wall or barrier between chambers.

An inlet 18 is attached in fluid communication to inlet chamber 12 so that the oil and water mixture pumped from a oil spill may enter inlet 18 through hose 16. The oil and water mixture then travels through opening 23 in baffle 22 into intermediate chamber 13. The combination of baffle 22 and opening 23 reduces the amount of agitation passed from inlet chamber 12 to intermediate chamber 13, thereby enhancing the oil and water separation in chamber 13.

A series of intermediate chambers 13 may be connected in a linear fashion by baffles 22 having openings 23 at their bottoms. In this way, an oil and water mixture will flow under pressure from inlet chamber 12 through openings 23 into intermediate chamber 13 and from intermediate chamber 13 to additional intermediate chamber 13 through openings 23. Since the flow of the oil and water mixture is at the bottom of the baffles, the oil and water mixture in each individual intermediate chambers 13 above this bottom flow area will be relatively turbulent free and will remain in the chambers for a comparatively long time.

This combination of a turbulent free environment and of the oil and water mixture remaining in a chamber for an appreciable length of time allows the oil and water to separate so the oil rises to the top of each chamber. The separated water is then more likely to mix with the oil and water mixture flowing through openings 23 thereby diluting the oil and water mixture as it moves from chamber to chamber. Although oil and water separation will take place in subsequent intermediate chambers, because the oil and water mixture becomes progressively more and more dilute, the oil is more likely to accumulate in significant amounts in the earlier intermediate chambers then in the later ones.

As the earlier intermediate chambers become filled with oil, oil will seep from one chamber to the subsequent chambers through the openings 23 until all the intermediate chambers are filled with oil. After the intermediate chambers 13 fill with oil, oil will seep through opening 23 into final intermediate chamber 15. Oil in final intermediate chamber 15 will rise to the top of the final intermediate chamber where opening 25 in baffle 24 at the top of the baffle is provided. Oil accumulating at the top of final intermediate chamber 15 will also accumulate at the top of outlet chamber 14 so that both final intermediate chamber 15 and outlet chamber 14 will fill at approximately the same rate.

When both chambers 15 and 14 are filled with oil, oil will begin to exit the container 10 through outlet 20. At this time outlet 20 and inlet 18 should be closed. The container 10 may then be towed via cables 26 to a storage space where the oil may be removed.

Figure 2:
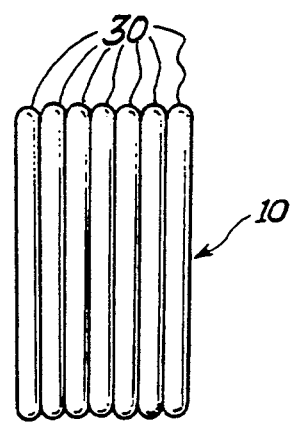
FIG. 2 is a side elevational view of the device in its compressed or storage position.

FIG. 2 shows the container 10 in its compressed or storage position. In this configuration, the individual chambers are compressed upon their linear axis so that the linear dimension of the device is considerably shortened. Flexible, semi-rigid plastic ribs 30 are mounted to the container 10 in order to maintain a cylindrical configuration when stored or in operation. This compact cylindrical shape lends itself to easy storage and transportation of the container 10.

The flexible, semi-rigid plastic ribs 30 are attached, in the preferred embodiment, to the outside of the container by any conventional method such as gluing or heat bonding. These ribs 30 extend around the container 10 to add rigidity to the device in both the storage and operational configurations. In the preferred embodiment, ribs 30 extend completely around and encircle container 10 thereby imparting a cylindrical shape to container 10. In an alternate embodiment, ribs 30 may extend over a significant portion of the circumference of but not extend completely around container 10.

In the storage configuration, the flexible material making up the walls of the chambers is collapsed between respective ribs 30. In this way, ribs 30 help to keep the flexible wall material of the chambers from collapsing on itself. Without the plastic ribs 30 in the storage configuration, an indeterminate storage shape for the container 10 would result. With the plastic ribs 30, a cylindrical shape is maintained for the container 10 despite the collapse of the flexible wall material of the chambers for storage.

In the operational configuration, the plastic ribs 30 provide rigidity and the definition of the elongated cylindrical shape of the container 10, particularly after the container 10 is moved from its storage configuration to its operational configuration but before the oil and water mixture is applied to the container 10 through the inlet 18.

Figure 3:
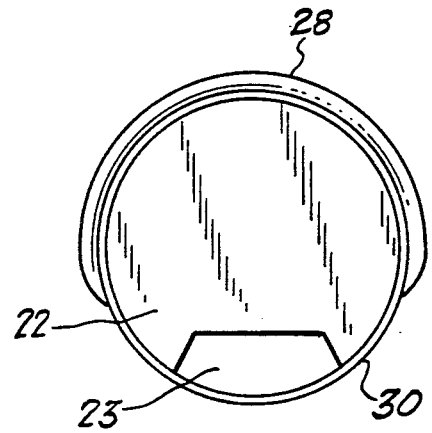
FIG. 3 is a front to rear cross sectional view of the device in FIG. 1 through one of the intermediate chambers.

FIG. 3 shows a cross sectional view of one of the intermediate chambers 13 showing the baffle 22 with the opening 23. Surrounding the container 10, in the preferred embodiment, is a flotation chamber 28 which may be filled with air or similar gas to aid the buoyancy of the device. This feature may be necessary, especially in the initial stages of filling the container 10 with water and oil, as there may not be sufficient oil within the device to render the device buoyant. In addition, the flotation chamber 28 may be used to make the container 10 more buoyant in the water even when filled with oil thereby making the device float higher in the water.

Another feature of flotation chamber 28 is that, when inflated, flotation chamber 28 will provide longitudinal rigidity and define the elongated shape of container 10 in a manner similar to an inflated balloon.

It is envisioned that the present invention would be deployed on vessels that would ultimately be engaged in an oil spill clean-up operation. Several of the collapsed containers would be carried aboard ship and can be readily deployed because of their lightweight and flexible construction. Further, the devices would then be used to tow the oil to a safe place for capture or reclaiming the oil contained in each container. The use of the device alleviates the need for specially built ships, barges and, other expensive oil containers. Because of their low cost containers 10 can be widely distributed throughout numerous ships so that they are readily available at the site of an oil spill without waiting for specialized vessels to arrive at the scene of the oil spill.

The instant invention has been shown and described in what is considered to be the most practical and preferred embodiment. While the principles of this invention have been described in connection with the specific apparatus, it is to be clearly understood that this description is made only by way of example and not as a limitation to the scope of the invention. It is recognized that departures may be made from the specific description contained herein and still be within the scope of the invention. It is further recognized that obvious modifications will occur to a person skilled in the art.

I claim:

1. A collapsible container for separating oil and water and containing and transporting the separated oil comprising:

a flexible water impervious container having at least three chambers capable of holding oil and water, said chambers attached to each other serially along a linear axis so that each of said chambers has at most two neighboring chambers, one of said chambers located at one end of said container being an inlet chamber, one of said chambers located at the opposite end of said device from said inlet chamber being an outlet chamber, and said chambers located between said inlet and said outlet chambers being intermediate chambers;

at least one lower opening baffle, said lower opening baffle being substantially vertically disposed within said container, each of said lower opening baffles having an aperture at the lowermost part of said lower opening baffle through which liquids may flow, a first lower opening baffle connecting said inlet chamber to one of said intermediate chambers, and additional lower opening baffle connecting each of said intermediate chambers to another one of said intermediate chambers if a plurality of intermediate chambers are provided;

an upper opening baffle, said upper opening baffle being substantially vertically disposed within said container, said upper opening baffle having an aperture at the uppermost part of said upper opening baffle through which liquids may flow, said upper opening baffle connecting said outlet chamber to one of said intermediate chambers;

means through said container for allowing an oil and water mixture to enter said inlet chamber; and means through said container for allowing material within said outlet chamber to exit said outlet chamber.

2. The device of claim 1 wherein said means for allowing an oil and water mixture to enter said inlet chamber comprises an inlet attached to said inlet chamber, said inlet attached substantially to the top side of said inlet chamber, said inlet being selectively closable.

3. The device of claim 1 wherein said means for allowing material within said outlet chamber to exit said outlet chamber comprises an outlet attached to said outlet chamber substantially at the bottom side of said outlet chamber, said outlet being selectively closable.

4. The device of claim 1 further comprising means for towing said device.

5. The device of claim 1 wherein said chambers are substantially cylindrically shaped.

6. The device of claim 1 wherein said chambers are substantially aligned along a common longitudinal axis.

7. The device of claim 6 wherein said chambers are manufactured of a flexible, collapsible material so that said chambers may be collapsed along said common longitudinal axis thereby reducing the axial length of said device.

8. The device of claim 7 further comprising flexible, semi-rigid plastic ribs, extending around and attached to said chambers of said device, said ribs imparting rigidity to said device in a collapsed configuration.

9. The device of claim 1 further comprising at least one flotation chamber extending around said device, said flotation chamber capable of receiving a gas thereinto increase the buoyancy of said device.

10. A device for separating oil and water and containing the separated oil comprising:

a container having at least three chambers capable of holding oil and water, said chambers attached to each other in a substantially horizontal and linear fashion so that each of said chambers has at most two neighboring chambers, said chambers being substantially cylindrically shaped and aligned along a common longitudinal axis, said chambers being manufactured of a flexible, collapsible material so that said chambers may be collapsed along said common longitudinal axis thereby reducing the axial length of said container for storage, said chamber located at one extreme end of said container being an inlet chamber, said chamber located at the opposite extreme end of said container from said inlet chamber being an outlet chamber, and said chambers located between said inlet and said outlet chambers being intermediate chambers;

at least one lower opening baffle, said lower opening baffle being substantially vertically disposed, said lower opening baffle having an aperture at the lowermost part of said lower opening baffle through which liquids may flow, a first lower opening baffle connecting said inlet chamber to one of said intermediate chambers, and additional lower opening baffles connecting each of said intermediate chambers to another one of said intermediate chambers if a plurality of intermediate chambers are provided;

an upper opening baffle, said upper opening baffle being substantially vertically disposed, said upper opening baffle having an aperture at the uppermost part of said upper opening baffle through which liquids may flow, said upper opening baffle connecting said outlet chamber to one of said intermediate chambers;

an inlet attached to said inlet chamber for an oil and water mixture to enter said inlet chamber, said inlet attached substantially to the top side of said inlet chamber, said inlet being selectively closable;

an outlet attached to said outlet chamber substantially at the bottom side of said outlet chamber, said outlet being selectively closable; and, at least one flotation chamber extending around said device, said flotation chamber capable of receiving a gas therein to increase the buoyancy of said device.

11. The device of claim 10 further comprising means for towing said device.

12. The device of claim 11 wherein said means for towing said device comprises:

cabling, attachable to a towing vessel; and, means for securely attaching said cabling to said container.

13. The device of claim 10 further comprising flexible, semi-rigid ribs, extending around and attached to said chambers of said container, said ribs imparting rigidity to said container in both the storage and operational configuration.

14. The device of claim 10 further comprising means for supplying an oil and water mixture under pressure to said inlet.

15. A device for separating oil and water and containing the separated oil comprising:

a container having at least three chambers capable of holding oil and water, said chambers attached to each other in a substantially horizontal and linear fashion so that each of said chambers has at most two neighboring chambers, said chambers being substantially cylindrically shaped and aligned along a common longitudinal axis, said chambers being manufactured of a flexible, collapsible material so that said chambers may be collapsed along said common longitudinal axis thereby reducing the axial length of said container for storage, said chamber located at one extreme end of said container being an inlet chamber, said chamber located at the opposite extreme end of said container from said inlet chamber being an outlet chamber, and said chambers located between said inlet and said outlet chamber being intermediate chambers;

at least one lower opening baffle, said lower opening baffle being substantially vertically disposed, said lower opening baffle having an aperture at the lowermost part of said lower opening baffle through which liquids may flow, a first lower opening baffle connecting said inlet chamber to one of said intermediate chambers, and additional lower opening baffles connecting each of said intermediate chambers to another one of said intermediate chambers if a plurality of intermediate chambers are provided;

an upper opening baffle, said upper opening baffle being substantially vertically disposed, said upper opening baffle having an aperture at the uppermost part of said upper opening baffle through which liquids may flow, said upper opening baffle connecting said outlet chamber to one of said intermediate chambers;

an inlet attached to said inlet chamber of an oil and water mixture to enter said inlet chamber, said inlet attached substantially to the top side of said inlet chamber, said inlet being selectively closable;

an outlet attached to said outlet chamber substantially at the bottom side of said outlet chamber, said outlet being selectively closable;

at least one flotation chamber extending around said device, said flotation chamber capable of receiving a gas therein to increase the buoyancy of said device;

means for towing said device; and flexible, semirigid plastic ribs, extending around and attached to said chambers of said container, said ribs imparting rigidity to said container in both the storage and operational configuration.

16. A device as in claim 15, including:

means for supplying an oil and water mixture under pressure to said inlet.

* * * * *